Figure 1:
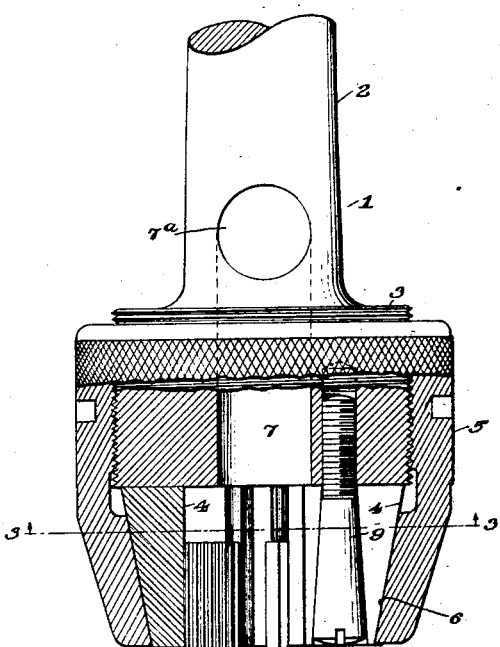

Oct. 23, 1928.

O. SEVERSON 1,688,558

HOLLOW MILL

Filed Dec. 20, 1924

Inventor
Ole Severson
By Attorney
Albert F. Nathan

Patented Oct. 23, 1928.

1,688,558

UNITED STATES PATENT OFFICE.

OLE SEVERSON, OF SHELTON, CONNECTICUT, ASSIGNOR TO THE O. K. TOOL COMPANY, INC., OF NEW YORK, N. Y., A CORPORATION OF NEW YORK.

HOLLOW MILL.

Application filed December 20, 1924. Serial No. 757,198.

My invention relates to metal cutting tools and particularly to hollow mills having detachable cutting blades which may be radially adjusted.

One object of my invention is to provide a cutting tool of the detachable-blade type that shall have an improved coarse and fine adjustment for accurately positioning the cutting blades radially with respect to the axis of the tool.

Another object of my invention is to provide a detachable-blade cutting tool of the hollow mill type that shall be provided with improved means for so mounting the blades in blocks as to permit the ready adjustment of the blades in the blocks radially with respect to the axis of the mill and that shall be provided with improved means for not only securing the blocks firmly in position but also for effecting a radial adjustment of them with respect to the axis of the mill.

In constructing cutting tools of the hollow mill type it is very desirable to provide detachable blades or cutting members which may be readily removed for replacement and repair and which may be shifted into new positions to permit additional grinding without loss of size. Moreover it is very desirable to provide means for insuring against any loss in rigidity of the tool when the cutting blades are shifted to new positions for taking care of wear.

In a hollow mill constructed in accordance with my invention, the cutting blades are so mounted in detachable blocks as to permit the adjustment of the blades in the blocks radially with respect to the axis of the tool. By such means a rough adjustment of the blades radially with respect to the axis of the tool may be effected. The blocks, which support the cutting blades, are so secured to the head of the tool or mill as to permit a fine adjustment of them radially with respect to the axis of the cutter. Thus, a rough adjustment of the cutting blades is effected by varying the position of the cutting blades in the blocks and a fine adjustment of the cutting blades is effected by varying the position of the blocks on the head of the tool. The cutting blades are so secured to the supporting blocks as to insure the rigidity of the tool when the blades are shifted radially to permit additional grinding thereof. The means for securing the blades in the blocks is of such nature as to provide for the above adjustment while insuring a tool of rigid construction.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 3:
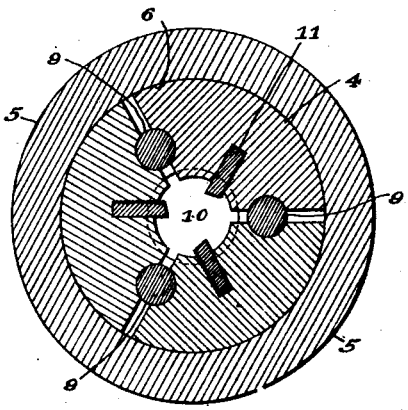
Figure 4:
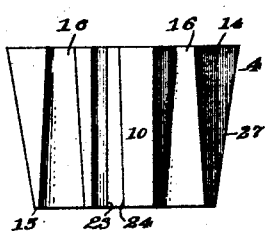
Figure 2:
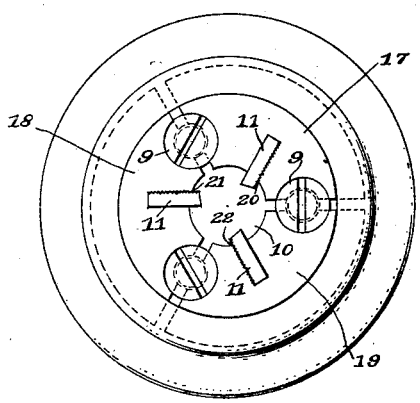

Referring to the accompanying drawing, Figure 1 is a side elevational view, partially in section, of a hollow mill constructed in accordance with my invention. Fig. 2 is an end view of the hollow mill shown in Fig. 1. Fig. 3 is a sectional view along the line 3—3 of Fig. 1. Fig. 4 is an elevational view of an adjusting block and Fig. 5 is a plan view of the adjusting block shown in Fig. 4.

Referring to the drawing, a hollow mill is illustrated comprising a body member 1 having a shank portion 2 and a head portion 3. The shank portion 2 is tapered and preferably so shaped as to fit in the ordinary tapered drill holder. Moreover the shank portion 2 is preferably formed with an opening 7 therein to receive the finished end of the work piece being operated on and to take care of chips. A hole 7ª connects with the opening 7 for removing the chip therethrough. The head portion 3 serves to support a number of adjusting blocks 4 which are held in position by means of a sleeve member 5. In the drawings only three adjusting blocks 4 are illustrated, but it is to be understood that the number of such adjusting blocks may be varied as desired. The sleeve member 5 is threadably connected to the head portion 3 of the tool and is provided with an internal truncated cone-shaped surface 6. The surface 6 on the sleeve 5 engages a similar truncated cone-shaped surface which is formed on the periphery of the adjusting blocks 4. It is apparent that by adjusting the position of the sleeve 5 on the head 3 by means of the screw threads, the radial position of the blocks 4 with respect to the axis of the tool is varied.

The blocks 4, which are formed in the shape of sectors, are separated by means of wedge-bolts 9 and are mounted on the head of the tool so as to form an opening 10 through them. The cutting blades 11, which are mounted in the blocks 4, project into the opening 10, as indicated in Figs. 2 and 3 of the drawing. The wedge-bolts 9, which separate the adjusting blocks 4, are threadably connected to the head 3 of the tool and have the upper portions thereof formed in the shape of truncated cones. The portions of the adjusting blocks 4, which engage the wedge-bolts are inclined or wedged-shaped to correspond to the truncated cone surfaces on the bolts. Thus, by adjusting the position of the wedge-bolts 9, the radial position of the adjusting blocks 4 is varied with respect to the axis of the mill. In order to effect a fine adjustment of the blades 11 radially with respect to the axis of the mill, the wedge-bolts 9 are positioned to vary the radial position of the blocks 4 and the sleeve member 5 is operated to not only securely clamp the blocks 4 in engagement with the head 3, but also to hold the blocks 4 in adjusted position with respect to the wedge-bolts 9.

Figure 5:
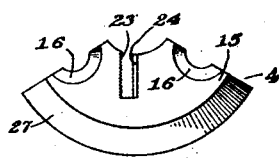

Each of the adjusting blocks are in the shape of a sector of a truncated cone, as shown in Figs. 4 and 5 of the drawing. The outside surface 27 of each block is inclined or wedge shaped to fit the truncated-cone surface 6 on the sleeve member 5. The bottom surface 14 of each block rests on the top surface of the head 3. The upper surface 15 of each block is preferably formed parallel to the bottom surface 14. Grooves 16 are formed in the block to fit the wedge bolts 9. The grooves 16 permit a limited radial movement of the blocks 4 to effect a fine adjustment of the cutting blades 11. The interior portion of the blocks, as above set forth, are cut away to form an opening 10 through them.

The three adjusting blocks 4 are designated by the reference characters 17, 18 and 19 for explaining the radial adjustment of the cutting blades 11 in the blocks. The blocks 17, 18 and 19, respectively have slots 20, 21 and 22 formed in them for receiving the blades 11. Each of said slots have a side surface 23 arranged parallel to a plane including the axis of the mill. Such side surface 23 in each slot is in the form of a series of ridges or corrugations preferably extending parallel to the axis of the tool. The ridges formed in the sides of the slots 20, 21 and 22 are similar in all respects except that the ridges in the different slots are displaced at slightly different distances toward the axis of the mill. The ridges in the slot 21 of the block 18 are located a small distance (say .005 of an inch) closer to the axis of the mill than the ridges in the slot 20 of the block 17. Likewise the ridges in the slot 22 of the block 19 are located a small distance closer to the axis of the tool than the ridges in the slot 21 of the block 18. In such construction it is apparent a cutting blade 11 having ridges formed on one face thereof to fit the ridges in the sides of the slots 20, 21 and 22, will protrude progressively further into the opening 10 when successively inserted in each of the slots.

In order to securely wedge the blades 11 in the slots formed in the blocks 4, one side 24 of each slot 20, 21 and 22 is formed at an angle with respect to the opposite side 23. A wedging action is thus produced on the blade between the two surfaces 23 and 24 of a slot. The slots as shown in Fig. 1, are preferably somewhat longer than the blades to provide a sufficient degree of clearance, whereby the blades are readily secured in position by driving them into the slots parallel to the axis of the mill until the friction prevents further movement.

The cutting blades 11, which are secured in the slots 20, 21 and 22 formed in the adjusting blocks 4, have ridges or serrations formed on one face thereof which, as above set forth to conform to corresponding ridges or serrations in the sides of the slots. The serrations serve to prevent any radial movement of the blade with respect to the block during the cutting operation and provide an efficient means for adjusting the blades radially with respect to the axis of the mill. Each blade 11 is wedge-shaped in order to fit in the slots formed in the blocks. The end and one side edge of each blade may be ground and sharpened and the tool used until the blades become dull. Thereupon, by striking the protruding end edges of the blades, they may be driven out and replaced in the next adjacent slot of the series of slots. This will result in shifting each tooth, except the last tooth, radially toward the axis of the mill a distance corresponding to the increment between the position of the ridges in the successive slots. The last blade will fall into the place of the first blade and will be shifted a complete corrugation and in consequence will protrude somewhat more than the other blades because the corrugations are usually wider than the sum of the increments. The extra protrusion of the last tooth will, of course, be ground off and the whole series of blades ground down to the correct diameter and sharpened.

An important feature of the structure, above described, is that no extra fastening elements are necessary to hold the cutting blades in position. The cutting blades hold themselves in the slots by reason of the wedging action against the sides of the slots. The advance of a cutting blade, when the end thereof is used as a cutting surface, is in a direction opposite to the wedging action and accordingly the heavier the duty performed by the blades, the more securely it will remain in place.

In the above described hollow mill, it will be noted a rough adjustment of the cutting blades with respect to the axis of the mill is effected by varying the position of the blades of the adjusting blocks. A final or fine adjustment of the cutting blades radially with respect to the axis of the mill is effected by varying the position of the adjusting blocks by means of the wedge-bolts.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a hollow mill, the combination comprising a body member having a head portion; detachable blocks secured to said head; detachable wedge shaped blades secured to said blocks; means comprising serrations on the sides of the blades and on the blocks, for varying the position of the blades in the blocks; and means for varying the position of the blocks to radially adjust the blades with respect to the axis of the mill.

2. In a hollow mill, the combination comprising a body member having a head portion; detachable blocks adjustably mounted in said head and having slots formed therein; detachable blades mounted in the slots in said blocks, each of said blades having a series of corrugations parallel with one of its cutting edges; and said slots in the blocks having interfitting corrugations progressively set towards the axis of the mill whereby upon shifting each of said cutting blades to the slot next advanced it will protrude to a slightly greater extent.

3. In a milling tool, the combination comprising a body member having a head portion; a plurality of blocks detachably secured to said head; and detachable blades secured to said blocks, said blocks being so secured to the head as to permit a fine radial adjustment of the blocks with respect to the axis of the tool and the blades being so secured to the blocks as to permit a rough adjustment of the blades radially with respect to the axis of the tool.

4. In a milling tool, the combination comprising a body member having a head portion formed thereon; a plurality of blocks mounted on said head and carrying cutting blades; a sleeve member secured to the head and adapted to lock the blocks in position; and wedge bolts secured to the head and located between the blocks for adjusting the radial position of the blocks with respect to the axis of the tool.

5. In a milling tool, the combination comprising a body member having a head portion formed thereon; a plurality of sector-shaped blocks mounted on said head and carrying cutting blades; a sleeve member secured to the head and having an internal wedging surface for holding the blocks in position; wedge bolts secured to the head and located between the blocks for adjusting the radial position of the blocks with respect to the axis of the tool.

6. In a hollow mill, the combination comprising a body member having a head portion formed thereon; a plurality of sector-shaped blocks mounted on said head; a sleeve member secured to the head and having an internal wedging surface for holding the blocks in position; wedge bolts secured to the head and located between the blocks for adjusting the radial position of the blocks with respect to the axis of the mill; and cutting blades mounted on said blocks to permit their adjustment radially with respect to the axis of the mill.

7. In a hollow mill, the combination comprising a body member having a head portion; sector-shaped blocks mounted on said head to form a central opening through them; cutting blades projecting into the opening formed by the blocks and secured in slots formed in the blocks; means for adjusting the blades in the blocks radially with respect to the axis of the mill; and means for securing the blocks to said head and for adjusting the blocks radially with respect to the axis of the mill.

8. In a milling tool, the combination comprising a body member having an enlarged cylindrical head portion; sector-shaped adjusting blocks mounted on said head; a sleeve member surrounding said blocks and threadedly connected to said head portion, said sleeve member having a wedging engagement with said blocks for holding the blocks in any set position; cutting blades mounted in slots formed in said blocks; serrations formed on the blades and on the side of the slots in the blocks for permitting the radial adjustment of the blades with respect to the blocks; and wedge bolts secured to said head and located between the blocks, said wedge bolts serving to adjust the blocks radially with respect to the axis of the tool.

9. In a hollow mill, the combination comprising a body member having a shank portion and an enlarged cylindrical head portion; a sleeve member adjustably secured to the head portion and having an internal surface in the form of a truncated cone; three sector-shaped adjusting blocks mounted on said head portion and located within said sleeve member; detachable blades mounted in slots formed in said adjusting blocks; and wedge bolts secured to said head and located between said adjusting blocks for co-operating with said sleeve member to position the adjusting blocks and the blades carried thereby with respect to the axis of the mill.

10. In a milling tool, the combination comprising a body member having a shank portion and an enlarged cylindrical head portion; a sleeve member threadably connected to the head portion and having an internal surface in the form of a truncated cone; three adjusting blocks mounted on said head portion within said sleeve and forced into engagement with said cylindrical portion by means of the internal wedge surface on said sleeve; cutting blades mounted in slots formed in said adjusting blocks; and wedge bolts connected to said head portion and located between the adjusting blocks, said bolts having wedge shaped surfaces for engaging similar surfaces on said adjusting blocks for holding the latter in contact with the sleeve member.

11. In a milling tool, the combination comprising a body member having a cylindrical head portion; adjusting blocks mounted on said head portion to form a central opening through them; a sleeve member connected to said head portion and having an internal wedging surface in the form of a truncated cone for engaging a corresponding surface formed on the periphery of the adjusting blocks; wedge bolts secured to the head portion and projecting between the adjusting blocks, said wedge bolts having wedging surfaces in the form of truncated cones for engaging corresponding surfaces formed on the adjusting blocks; and a series of detachable cutting blades providing cutting edges parallel to the axis of the tool, said blades having corrugations for engaging similar corrugations on the adjusting blocks and each set of corrugations on the adjusting blocks being set at progressively different distances from the axis of the tool.

12. In a milling tool, the combination comprising a body member having a head portion; detachable blocks secured to said head portion; detachable wedge shaped blades mounted in wedge shaped slots formed in said blocks, said blades having serrations formed thereon for fitting similar serrations formed in said slots to effect radial adjustment of the blades; and means for operating on said blocks to effect a second radial adjustment of the blades.

13. In a hollow mill, the combination comprising a body member having a head portion; detachable blocks secured to said head portion; detachable wedge shaped blades mounted in wedge shaped slots formed in said blocks, said blades having serrations formed thereon; serrations formed on a side of the slot in each block to fit the serrations in the blades, the serrations in the slots being progressively set a small increment towards the axis of the mill to radially adjust the blades when moved from one slot to another slot; and means for operating on said blocks to effect a second radial adjustment of the blades.

In witness whereof, I have hereunto subscribed my name.

OLE SEVERSON.